United States Patent
Garrigues et al.

(10) Patent No.: US 10,242,099 B1
(45) Date of Patent: Mar. 26, 2019

(54) CASCADED MULTI-TIER VISUAL SEARCH SYSTEM

(75) Inventors: Pierre Garrigues, San Francisco, CA (US); Benjamin Jackson Culpepper, Berkeley, CA (US); Huy X. Nguyen, Berkeley, CA (US); Charles Cadieu, Boston, MA (US); Andrew Stadlen, Mountain View, CA (US); Gerry Pesavento, Davis, CA (US); David Warland, Davis, CA (US)

(73) Assignee: OATH INC., New York, NY (US)

( * ) Notice: Subject to any disclaimer, the term of this patent is extended or adjusted under 35 U.S.C. 154(b) by 152 days.

(21) Appl. No.: 13/448,049

(22) Filed: Apr. 16, 2012

(51) Int. Cl.
*G06F 17/30* (2006.01)

(52) U.S. Cl.
CPC .. *G06F 17/30781* (2013.01); *G06F 17/30067* (2013.01)

(58) Field of Classification Search
CPC .............. H04L 67/32; G06F 17/30244; G06F 17/3028; G06F 17/30283; G06F 17/30067; G06F 3/0605; G06F 3/0683; G06F 3/0601; G06F 17/30607; G06F 3/0646; G06F 3/0655
See application file for complete search history.

(56) References Cited

U.S. PATENT DOCUMENTS

| 5,598,534 A * | 1/1997 | Haas ..................... G06K 9/222 710/7 |
| 8,028,039 B1 * | 9/2011 | Hawkins ....................... 709/219 |
| 2007/0021906 A1 * | 1/2007 | Yeh ......................... G01C 21/26 701/408 |
| 2008/0133336 A1 * | 6/2008 | Altman et al. .................. 705/10 |
| 2009/0076996 A1 * | 3/2009 | Hull et al. ...................... 706/46 |
| 2010/0235346 A1 * | 9/2010 | Baeza-Yates et al. ........ 707/713 |
| 2010/0250341 A1 * | 9/2010 | Hauser ............................ 705/10 |
| 2011/0010514 A1 * | 1/2011 | Benhase ................ G06F 3/061 711/162 |
| 2011/0268256 A1 * | 11/2011 | Ootsuka ....................... 379/1.01 |
| 2011/0282830 A1 * | 11/2011 | Malige et al. ................ 707/609 |
| 2012/0260040 A1 * | 10/2012 | Mallge et al. ................ 711/117 |
| 2013/0111010 A1 * | 5/2013 | Driesen et al. ............... 709/224 |
| 2013/0122934 A1 * | 5/2013 | Branch .................. H04W 4/21 455/456.3 |
| 2013/0201344 A1 * | 8/2013 | Sweet et al. .................. 348/169 |
| 2013/0212094 A1 * | 8/2013 | Naguib et al. ................ 707/730 |

* cited by examiner

Primary Examiner — Loc Tran
(74) Attorney, Agent, or Firm — Pillsbury Winthrop Shaw Pittman LLP (57) ABSTRACT

A system for multi-tier visual recognition comprises a processor and a memory. The processor is configured to calculate a rank for each of a plurality of object models. The plurality of object models are used for visual recognition. Each of the plurality of object models has a size. The processor is configured to divide the plurality of object models into a plurality of sets based at least in part on the rank for each of the plurality of object models, and provide a first set of the plurality of sets to a first tier and a second set of the plurality of sets to a second tier. The memory coupled to the processor and configured to provide the processor with instructions.

17 Claims, 10 Drawing Sheets

CASCADED MULTI-TIER VISUAL SEARCH SYSTEM

BACKGROUND OF THE INVENTION

The desirability and/or usefulness of a visual search system is often related to its ability to return results in an accurate and timely manner. However, image databases are often large, and visual searching techniques to search through those large image databases take too long to return results in an accurate and timely manner.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for multi-tier visual recognition comprises a processor and a memory. The processor is configured to calculate a rank for each of a plurality of object models. The plurality of object models are used for visual recognition. Each of the plurality of object models has a size. The processor is configured to divide the plurality of object models into a plurality of sets based at least in part on the rank for each of the plurality of object models. The processor is configured to provide a first set of the plurality of sets to a first tier and a second set of the plurality of sets to a second tier. The memory is coupled to the processor and is configured to provide the processor with instructions.

In various embodiments, tiers correspond to devices (e.g., client device, server, etc.), tiers correspond to memories (e.g., client device random access memory (RAM), client device flash, server RAM, server flash, server hard drive, etc.), tiers correspond to communication latencies (e.g., time to client device random access memory (RAM), time to mobile network server, time to low-latency Internet server, time to datacenter on Internet), tiers correspond to search fidelity/quality (e.g., low memory representations, provide lower-fidelity of object search results would be stored on the phone, and higher-memory representations of objects would be stored on the server), or any other appropriate tiers.

Figure 1:
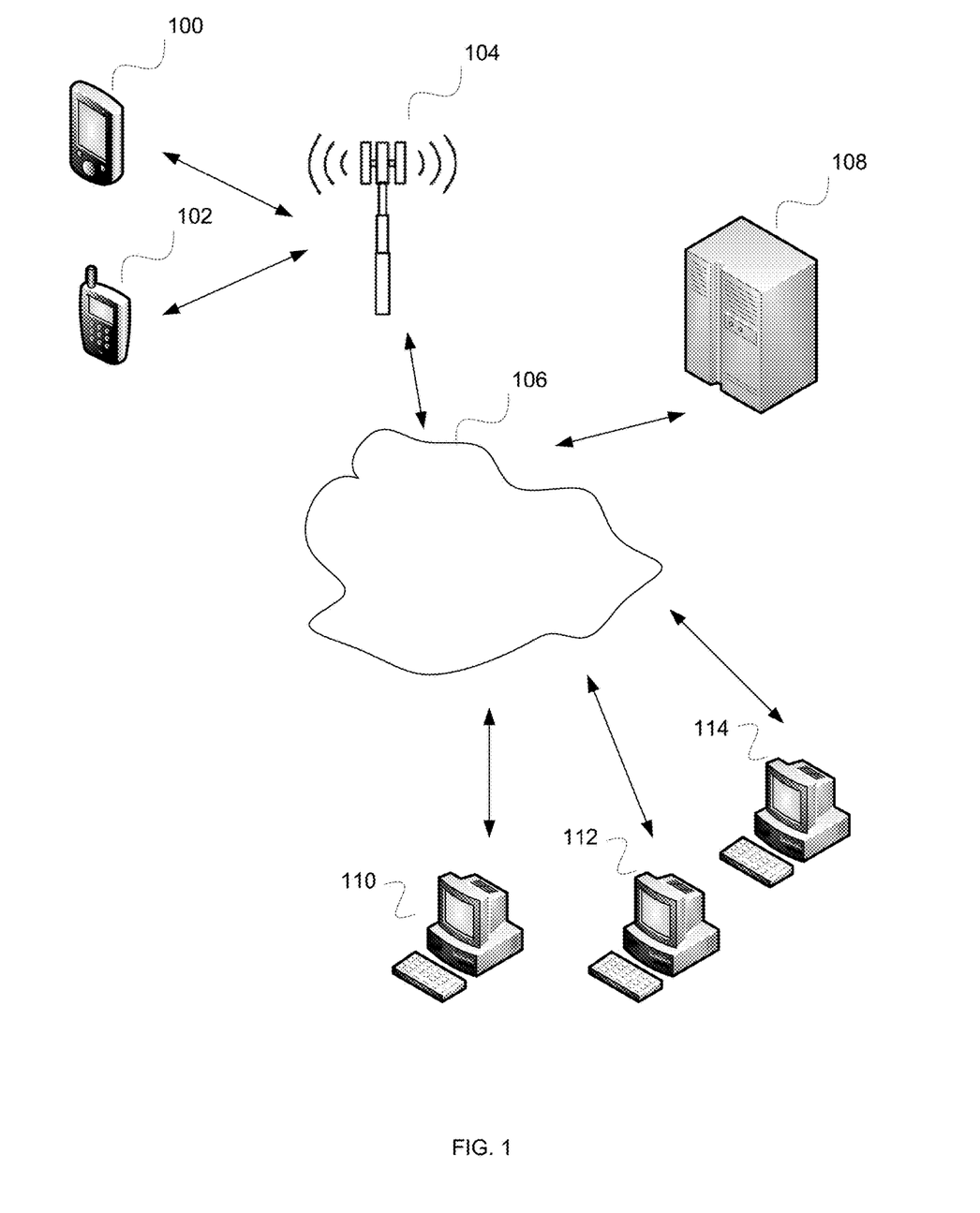
FIG. 1 is a block diagram illustrating an embodiment of a multi-tier visual search system.

FIG. 1 is a block diagram illustrating an embodiment of a multi-tier visual search system. In the example shown, a client device (e.g., device 100 or device 102) is used by a user that wants to recognize an object or identify an appropriate object or ranking of objects in the plurality of objects used for visual recognition. The client device includes an imaging device or camera. In various embodiments, the client device comprises a mobile device, a fixed device, a phone, a tablet, a camera, a laptop, a desktop computer, a webcam, an appliance, or any other appropriate imaging device. The imaging device takes an image or a series of images or a video analyzed as image frames of an object for which a visual search is desired to be performed. The visual search system has divided stored objects such that some object models are stored locally to the client device. Recognition of objects corresponding to data that is locally stored will happen quickly as the data can be accessed quickly. Visual recognition can be for any barcode type, icons, logos, advertisements, media, brands, products, geography, structures or any visual object. For example, recognition is not delayed because data is being transmitted to and from the client device. If the data is recognized locally, the recognition result is provided to the user. For example, a text tag, a metadata, a results indicator, a results page, or a vocalized tag, a visual animation, or an action such as a redirection to a webpage or a video, or a visual ranking of objects or a vocalized ranking of objects is provided to the user.

In the event that the image is not recognized at the client device, image information is sent to another component of the system. For example, image data, parameterized image data including image representations, or meta-information (e.g., time of image, date of image, location related to image, etc.) regarding the image is sent to a server (e.g., server 108) from the client device. In various embodiments, the server comprises a cloud-based or web-based server that receives data via a cellular network (e.g., via cell tower 104) and/or a network connection (e.g., network 106 such as the internet). The visual search system has divided stored object models such that some object models are stored locally to the server system. For example, objects are associated with a common object database or a personal object database. In some embodiments, the visual search system has replicated stored object models such that some object models are stored on both the client and on the server. Recognition of objects corresponding to data that is locally stored will happen relatively quickly as data can be accessed locally without a delay for the transmission of data from client device to the server. Full or partial recognition at the server can be from one or many processing modules, including 2D and 3D object recognition, optical character recognition, object class recognition, image similarity recognition, barcode recognition, face recognition, color, texture and shape analysis, or any other image processing technique. If the data is recognized at the server level, the recognition result is provided to the user by transmission back to the client device. For example, data is transmitted back to client device (e.g., device 100 or device 102) from server 108 and provided to the user.

In the event that the image is not recognized by the server, then the image information is sent to another component of the system. For example, the image data, parameterized image data, or meta-information (e.g., time of image, date of image, location related to image, etc.) regarding the image is sent to human crowd resources for recognition (e.g., crowd resource 110, crowd resource 112, crowd resource 114, etc.). For example, specialized resources (e.g., an image recognition specialist for a blind person, a botanist, a car specialist, etc.), family and/or friends resources (e.g., resources familiar with the user that can recognize items personally associated with the user), or general crowd resources might receive image data from the server and be directed to provide a recognition result such as a text tag or verbal identifier. The recognition result is provided to the user by transmitting via the server and network(s) back to the client device.

In some embodiments, image data is fed in parallel to visual recognition system components (e.g., device 100 or device 102, server 108, crowd resource 110, crowd resource 112, crowd resource 114, etc.) to identify one or more recognition results.

Figure 2:
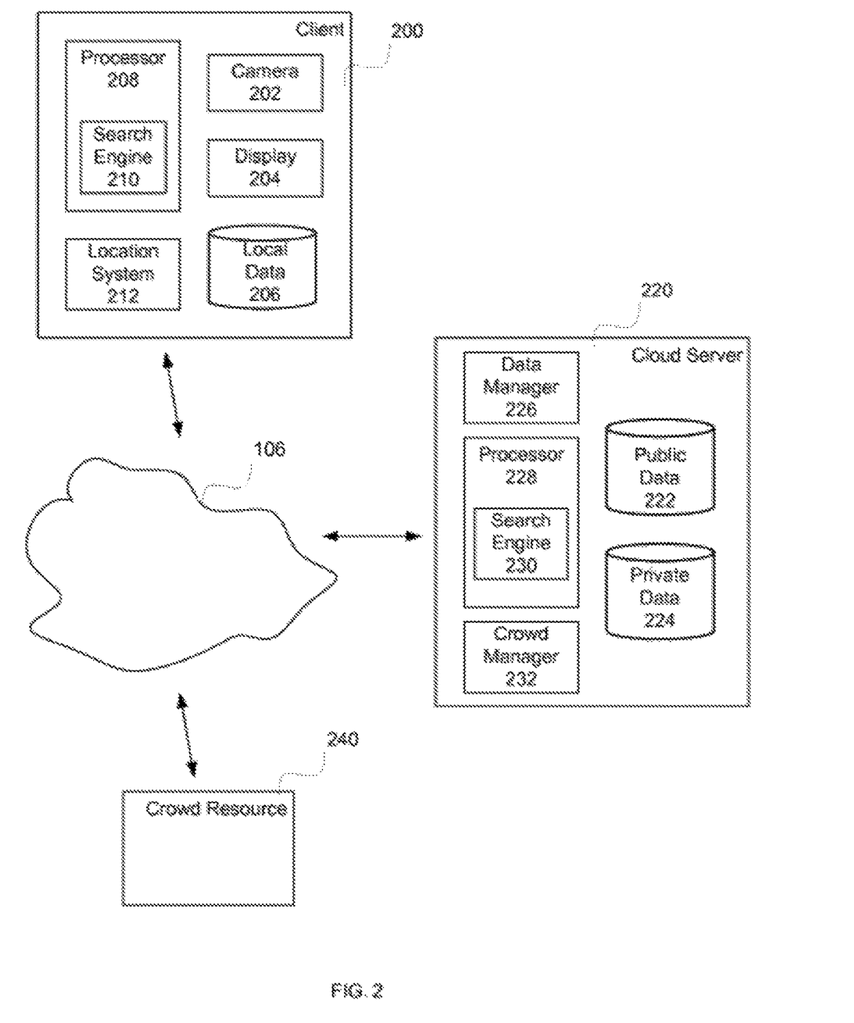
FIG. 2 is a block diagram illustrating an embodiment of a multi-tier visual search system.

FIG. 2 is a block diagram illustrating an embodiment of a multi-tier visual search system. In the example shown, client 200 includes camera 202, display 204, local data 206, processor 208, search engine 210, and location system 212. Camera 202 is able to take image data and/or video data and provide it to search engine 210. Search engine 210 comprises software executing on processor 208. Search engine 210 is able to recognize certain objects (e.g., 1-dimensional and 2-dimensional barcodes, objects stored locally in local data 206, etc.) in real-time.

Search engine 210 has the capability to be a visual scanner that looks for objects continuously. For example, search engine 210 includes intelligence for dropping blurred or poor quality images. In some embodiments, display 204 shows a semi transparent overlay with object recognition data overlaid on real-time image data. Search engine 210 learns objects by updating local object model data stored from either user feedback or server downloads.

Search engine 210 can improve image data from camera 202 by providing auto-zoom and/or auto-focus for the image data. In various embodiments, other image data improvement is enabled using automatic lighting or light sensitivity adjustments. In some embodiments, search engine 210 adjusts frame rate for image data acquisition as well. In some embodiments, search engine 210 captures an image or is used to indicate visual search intent during periods of low or no motion as determined by a motion sensor. In some embodiments, phone movement and imaging of a single object enable the capturing of 3-dimensional information of the object.

Search engine 210 also receives information regarding the user. For example, personal search history, preferences, personal search object libraries, or other personal information is used by the visual search system to help in identifying image data. In some embodiments, personal items, or common goods, are added to personalized databases that are stored at least partially in local data 206 along with associated unique text, data, and audio tags to their objects. A user will be able to take multiple photos, or a video of an object they wish to add to the personal database, and the user will then be able to associate meta-information with this object, such as an audio tag, which will be retrieved later by the search engine. When the user performs a visual search, the system will search the individual personalized database and return to them the meta-information they created, and if not found in the personalized database, the general database will be searched. In some embodiments, location information from location system 212 is also used to help in identifying the image data.

In some embodiments, a user interface allows a user to browse the objects in their personalized database. In some embodiments, a user interface allows the individual to scroll through the objects in their personalized database, indexed by text tag, or repeated audio tag. In some embodiments, the computer vision system dynamically loads the parameters of the model that have been learned for a specific object. In some embodiments, a real-time client-side detection code is used to detect the location of an object in images taken by the cell-phone's camera (e.g., a 'find-it' application). The location of the detected object within the camera image is conveyed to the user by a visual or an audio cue, a highlighted or bounding box either a short spoken phrase (e.g. "top-right"), or a non-verbal audio cue that beeps with increasing frequency or has higher pitch when the center of the camera's viewfinder is moved closer to the detected object. Audio feedback allows a visually impaired user to use their personalized database to locate a specific object such as a media object in a pile of media objects on a coffee table or find personal objects such as a coffee cup or a box of personal supplies.

In the example shown in FIG. 2, cloud server 220 includes public data 222, private data 224, data manager 226, processor 228, search engine 230, and crowd manager 232. Data manager 226 determines a set of objects from public data 222 and/or private data 224 that is to be provided to a client (e.g., client 200). For example, a rank is determined for objects and that rank is used to determine the set of objects that are provided to the client. The set can be updated based on change of location, change of user preference, search history, user feedback, user's friend's change of location/preference/information/search, local event (e.g., retail sale, public event, private event, personal event, etc.), or any other appropriate trigger to update the client local data set. In some embodiments, private data 224 comprise data associated with a particular user (e.g., personalized search object information, a friend's or family's search object information, personalized tag data, personalized audible tag data, etc.) or a particular enterprise, entity or application. Public data 222 comprises general searchable objects or meta-information for a visual search system (e.g., image data, parameterized object data, tag data, audible tag data, etc.).

Processor 228 is configured to execute instructions stored in an attached memory—for example, search engine 230. Search engine 230 receives image data (e.g., from a client device) and searches for a match within public data 222 and private data 224 as appropriate. Search engine 230 returns recognition result(s), if one or more were identified. Recognition result(s) is/are provided to the user that initiated the search.

Crowd manager 232 provides image data to crowd resources (e.g., crowd resource 240) to get recognition result(s). Crowd resources can include experts, friends and family, and general resources that are able to recognize and tag image data. For example, some example crowds include:

- A specialized crowd to help a special community or specific search (e.g., a search for a blind person, a car search, a botanical search, a local store search, etc.): the members of this crowd have access only to images coming from applications for a special community or a specific type of search. The advantages of such a crowd are two-fold: the tagging can be free (e.g., volunteer as opposed to paid), and the qualifications will be higher than a default crowd as they have specialized familiarity with what the community usually is trying to identify.
- A friends and family crowd. People are commonly connected at all times to their social network of friends and family via the internet on their computers or mobile devices. A visual question is sent to a user's own social networks for recognition. Email invitations can be used to invite friends and family to be a crowd resource for search.
- A default crowd. A paid or volunteer crowd that has 24-hour availability and therefore responds quickly at all times.
- An expert crowd. A free or paid crowd that has specialized knowledge and therefore is likely to provide a precise response, but may not be available at all times due to a limit on the number of people or financial resources.

In some embodiments, in the context of image tagging by heterogeneous crowds, the search system goal is to guarantee that the user gets the best possible answer in a reasonable amount of time. It is believed that a user usually prefers an answer coming from their social network. However, it is not guaranteed that someone will be available at all times. On the other end, the default crowd is available at all times, but the quality of the tags will usually be of inferior quality as compared to someone from the user's network. To illustrate the visual search system's approach using three crowds A, B and C, the crowds are used in prioritized order A, then B, then C. When a user sends an image to the crowd-sourcing module, the image is provided to the members of crowd A and it is determined whether there is an active tagger in crowd A. If no member of crowd A is available or if after a delay of x seconds we do not have any response, then we make the image available to members of crowd B. Similarly, the image data can be sent to crowd C. The task is not made available to all crowds at the same time because higher prioritized crowds can offer potentially more appropriate recognition response(s) or a recognition response that is less costly.

Figure 3:
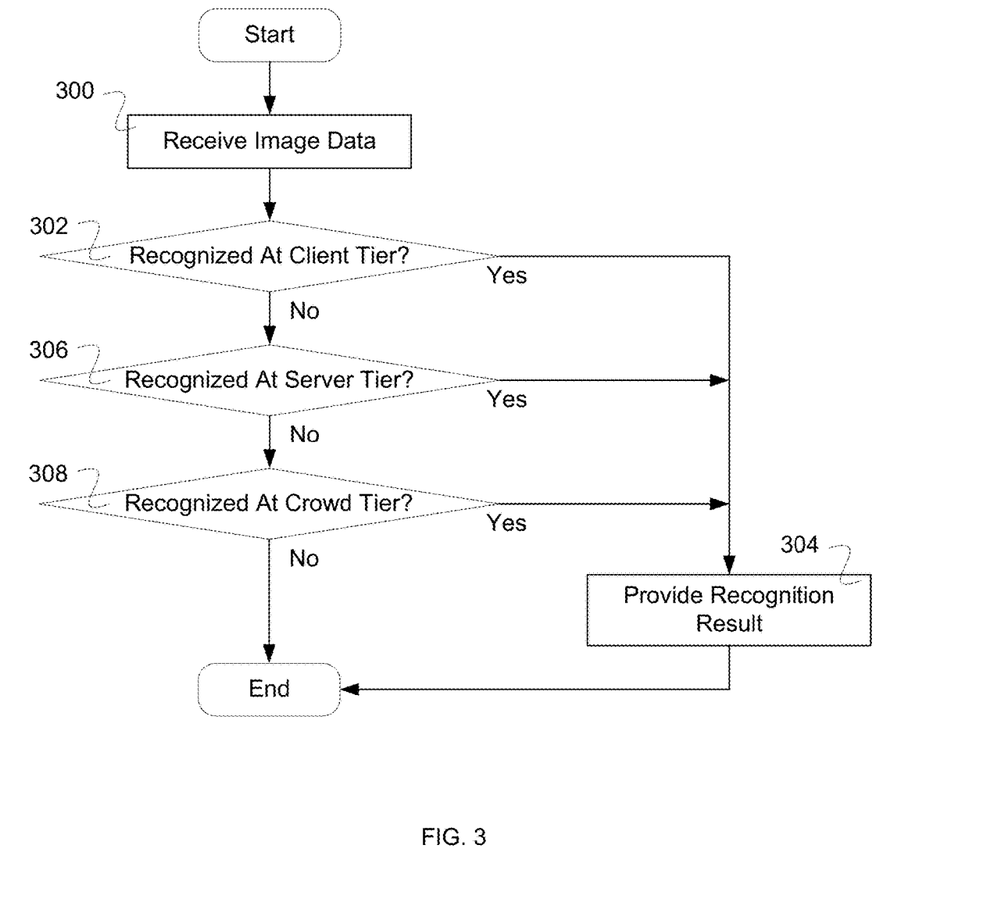
FIG. 3 is a flow diagram illustrating an embodiment of a process for multi-tier visual search.

FIG. 3 is a flow diagram illustrating an embodiment of a process for multi-tier visual search. In the example shown, in 300 image data is received. In some embodiments, the client tier comprises a first tier. In 302, it is determined whether the image data is recognized at the client tier. In the event that the image data is recognized at the client tier, control is transferred to 304 and the recognition result is provided—for example, the recognition result is provided to a user that initiated the search by providing image data. In the event that the image data is not recognized at the client tier, in 306 it is determined whether image data is recognized at the server tier. In some embodiments, the server tier comprises a second tier. In the event that the image data is recognized at the server tier, control is transferred to 304 and the recognition result is provided—for example, the recognition result is provided to a user that initiated the search by providing image data. In the event that the image data is not recognized at the server tier, in 308 it is determined whether image data is recognized at the crowd tier. In some embodiments, the crowd tier comprises a third tier. In the event that the image data is recognized at the crowd tier, control is transferred to 304 and the recognition result is provided— for example, the recognition result is provided to a user that initiated the search by providing image data. In the event that the image data is not recognized at the crowd tier, the process ends. In some embodiments, in the event that the image data is not recognized at the crowd tier, the result is provided by the end-user. In various embodiments, the client tier includes multiple tiers—for example, a tier for RAM stored objects/meta-information and a tier for flash stored objects/meta-information; the server tier includes multiple tiers—for example, a tier for RAM stored objects/meta-information, a tier for flash stored objects/meta-information, and a tier for disc store objects/meta-information; a crowd tier includes multiple tiers—for example, a specialized crowd, a friends and family crowd, an expert crowd, a general crowd, etc.; or the system has any other appropriate tier structure for visual searching. In various embodiments, results processed by lower tiers can be fed back to higher tiers to improve visual search in subsequent visual queries. For example, crowd tier results can be feed back to the Server or client tiers, or server tier results can be used to improve client tier results. In some embodiments, because each tier may not provide complete accuracy by itself, results from multiple tiers are combined for more precise results.

Figure 4:
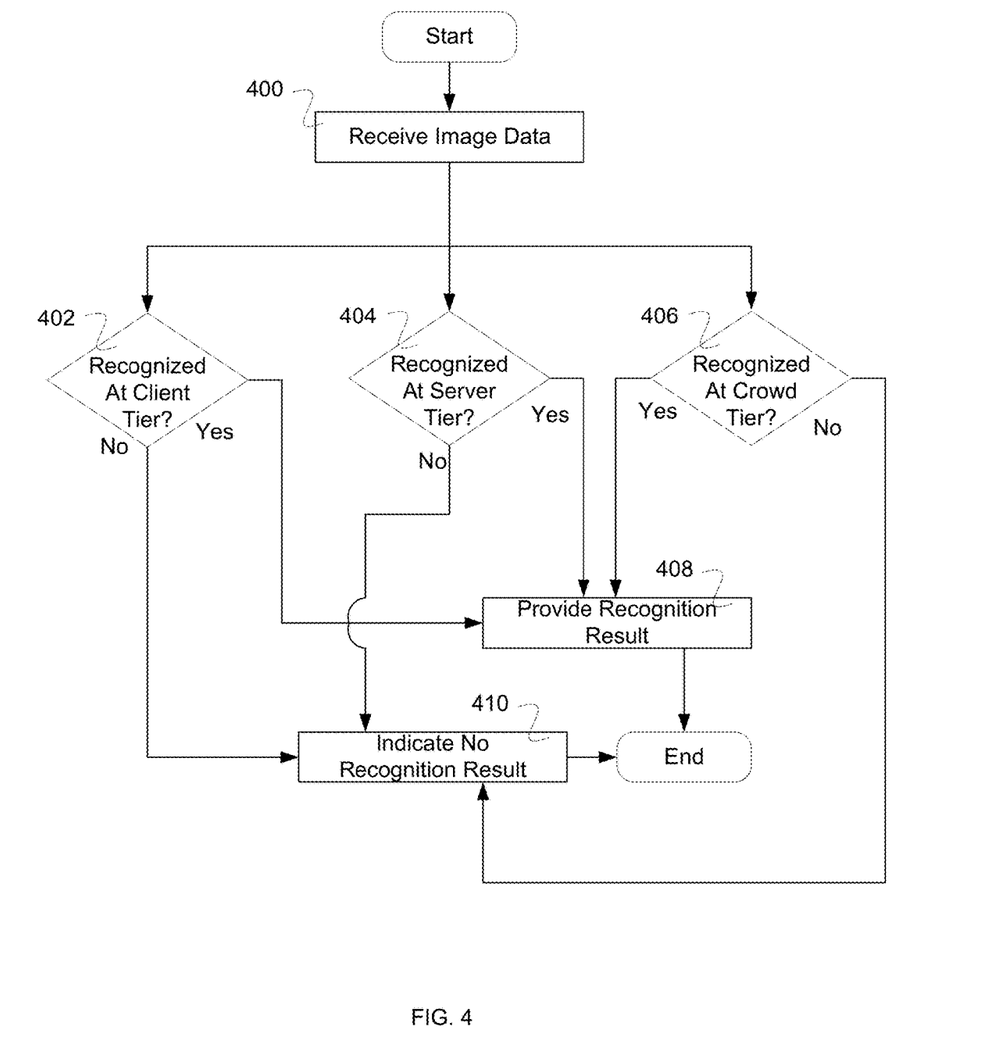
FIG. 4 is a flow diagram illustrating an embodiment of a process for multi-tier visual search.

FIG. 4 is a flow diagram illustrating an embodiment of a process for multi-tier visual search. In the example shown, in 400 image data is received. The image data is distributed to the client tier, the server tier, and the crowd tier in parallel. In 402, 404, and 406, it is determined whether image data is recognized at the client tier, the server tier, and the crowd tier, respectively. In the event that the image data is recognized, in 408 the recognition result is provided to the user that initiated the search and the process ends. In the event that the image data is not recognized, in 410 it is indicated there is no recognition result and the process ends.

Figure 5:
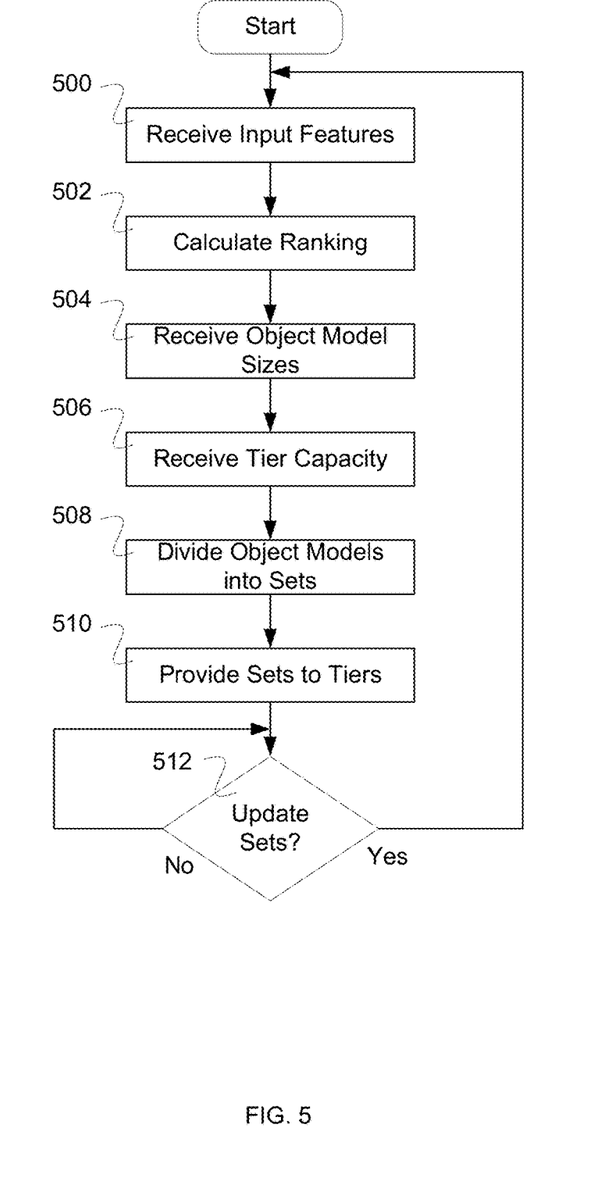
FIG. 5 is a flow diagram illustrating an embodiment of a process for providing sets to tiers.

FIG. 5 is a flow diagram illustrating an embodiment of a process for providing sets to tiers. In the example shown, in 500 input features are received. For example, features comprise information influencing the ranking of importance for objects or meta-information stored that the visual search system compares to for recognition. In various embodiments, features comprise one or more of the following: location information, search history information, personal preference information, friend and family information, popularity information, ontology information, or any other appropriate feature. In 502, a ranking is calculated. For example, objects or meta-information is ranked for probable importance with respect to visual searching for a given user. In some embodiments, the ranking function comprises a mapping from objects to scores, where the score comprises a number indicating how relevant the object is to the user; For example, the constant ranking function assigns the same number to all objects. In 504, object model sizes are received. For example, the object size and/or related information size or other meta-information size is received. In 506, tier capacity is received. For example, the storage space available for a tier is received. In 508, object models are divided into sets. For example, using the ranking and the available space in a tier, the objects are divided into the tiers (e.g., the first set of ranking objects that fit are allocated to the first tier, the next set of ranking objects that fit are allocated to the second tier and so on). In 510, sets are provided to tiers. In 512, it is determined whether sets are to be updated. For example, some event or change of circumstances indicates that the sets in the tiers should be optimized to improve visual searching speed. In various embodiments, the sets are updated when an indication is received regarding one or more of the following: a change of location of a user, a change of a user preference, a new search history pattern, a feedback from the user, a friend or family use or information change, a local event, or any other appropriate trigger for updating. In the event that the sets are to be updated, control passes to 500. In the event that the sets are not to be updated, control passes to 512.

Figure 6:
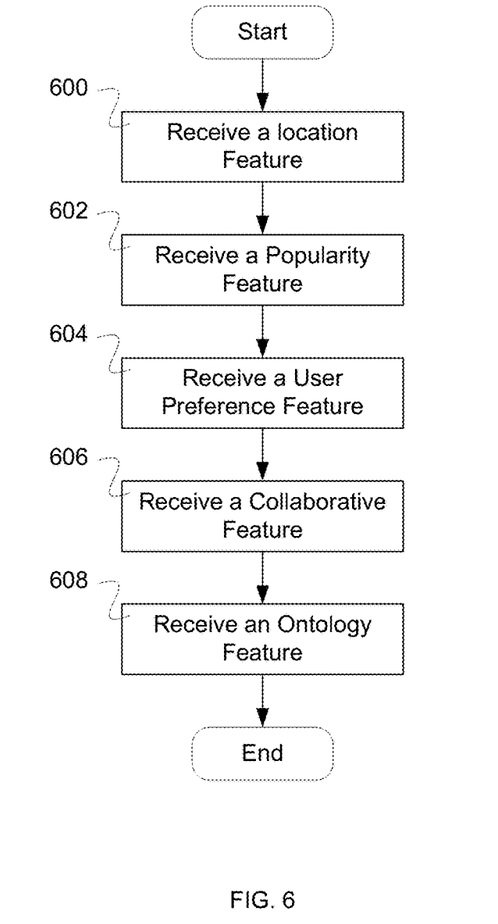
FIG. 6 is a flow diagram illustrating an embodiment of a process for receiving a feature set for providing sets to tiers.
Figure 7:
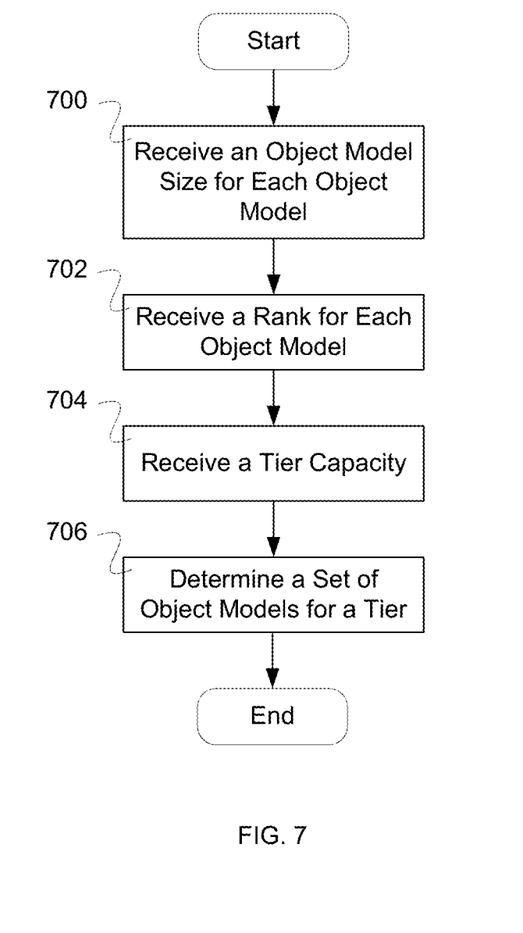
FIG. 7 is a flow diagram illustrating an embodiment of a process for dividing objects into sets.

FIG. 6 is a flow diagram illustrating an embodiment of a process for receiving a feature set for providing sets to tiers. In the example shown, in 600 a location feature is received. For example, a location coordinate (e.g., a street address, a business address, etc.), a room location (e.g., a user's bedroom), a function location (e.g., a bathroom, a ballpark, etc.), or other type of location is received that prompts the change of objects needed for visual search system speed as the likely searched objects would change based on the new location. In 602, a popularity feature is received. For example, given temporal (e.g., election day, Oscar night, etc.), location, or other factors a change in the popularity of search may change and prompt the likely requirement for updating or re-ranking of objects needed for a visual search. In 604, a user preference feature is received. For example, a user has a preference for searching for cars especially when at a race car track. In 606, a collaborative feature is received. For example, friends, family or likeminded users indicate likely priority for visual search objects. In 608, an ontology feature is received. For example, the tag 'automobile' may be provided to indicate the type of object results that are desired, or a tag 'Ford' to return the type of Ford automobile from the set of objects, or a tag 'Car-Make' to indicate that the manufacturer of the automobile is desired FIG. 7 is a flow diagram illustrating an embodiment of a process for dividing objects into sets. In the example shown, in 700 an object model size for each object model is received. In 702, a rank for each object model is received. In 704, a tier capacity is received. In 706, a set of object models is determined for a tier.

Figure 8:
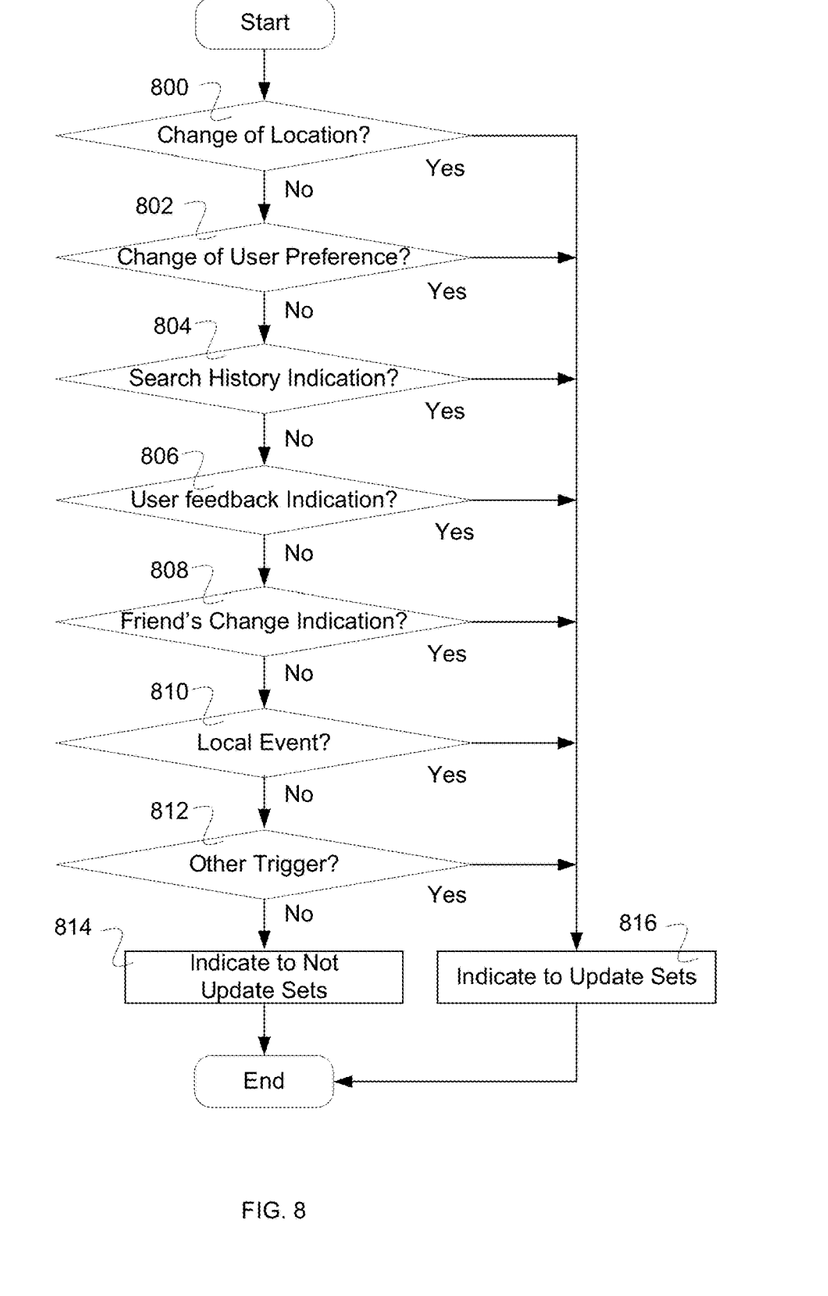
FIG. 8 is a flow diagram illustrating an embodiment of a process for determining whether to update sets.

FIG. 8 is a flow diagram illustrating an embodiment of a process for determining whether to update sets. In the example shown, in 800 it is determined whether a location has changed. In the event a location has changed, then in 816 it is indicated to update sets. In the event a location has not changed, then in 802 it is determined whether there is a change of user preference. In the event that a user preference has changed, then in 816 it is indicated to update sets. In the event that there is not a change of user preference, then in 804 it is determined whether there is a search history indication. In the event that there is a search history indication, then in 816 it is indicated to update sets. In the event that there is not a search history indication, then in 806 it is determined whether there is a user feedback indication. In the event that there is a user feedback indication, then in 816 it is indicated to update sets. In the event that there is not a user feedback indication, then in 808 it is determined whether there is a friend's change indication. In the event that there is a friend's change indication, then in 816 it is indicated to update sets. In the event that there is not a friend's change indication, then in 810 it is determined whether there is a local event. In the event that there is a local event, then in 816 it is indicated to update sets. In the event that there is not a local event, then in 812 it is determined whether there is another trigger. In the event that there is another trigger, then in 816 it is indicated to update sets. In the event that there is not another trigger, then in 814 it is indicated to not update sets.

In some embodiments, an update is transmitted to a phone immediately. In some embodiments, the timing of a transmission of the update of sets to a tier is based on thresholds. For example, if an object's rank changes by only a few places (e.g., due to a change location or other indication), and the user is on 3G, and the user does not have an unlimited bandwidth plan, then the update is delayed until they are on WiFi. However, if the object jumps significantly in rank (for example, a friend tweets "check out the new iWatches at the Apple store!!"), then it might be worth it to transmit on 3G. The thresholds could be configurable by and/or tailored to the user.

Figure 9:
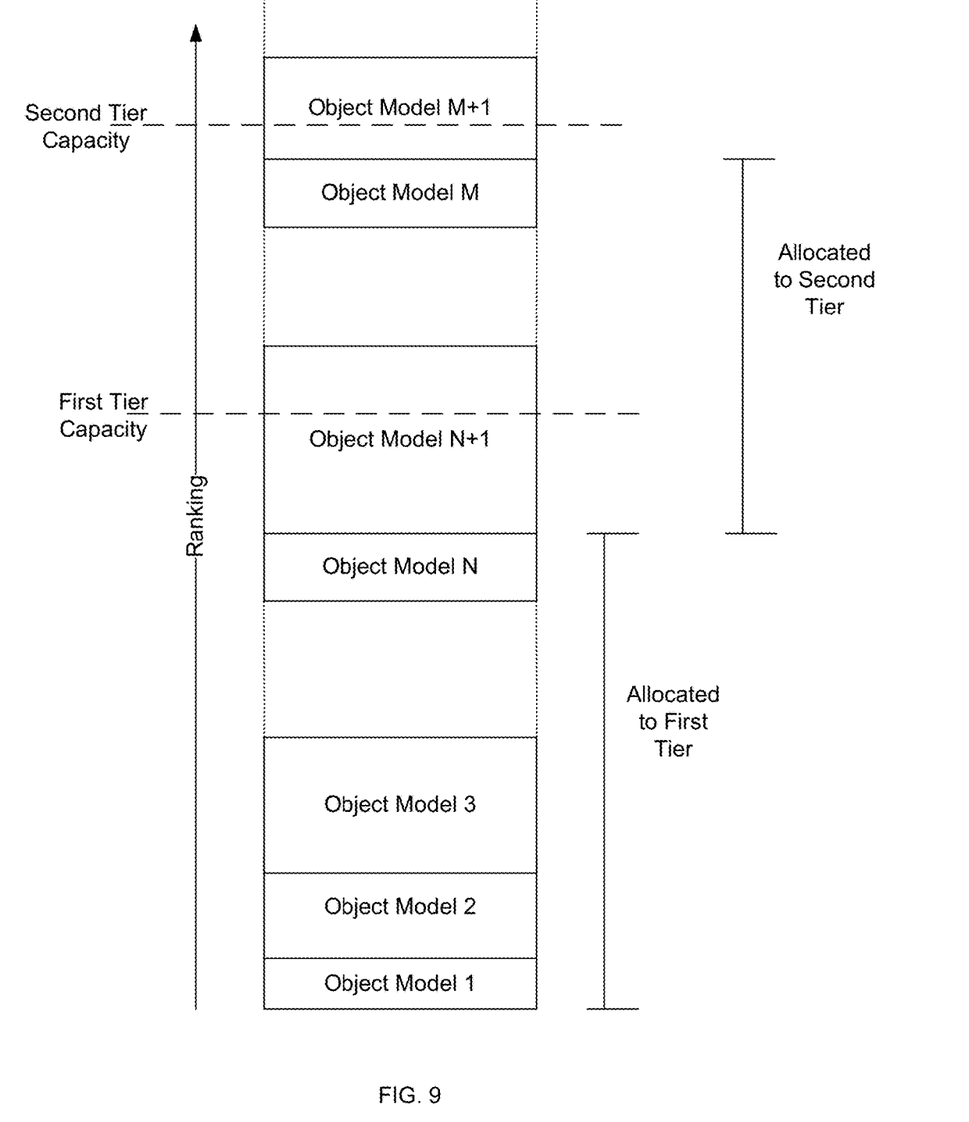
FIG. 9 is a block diagram illustrating an embodiment of dividing objects into tiers.

FIG. 9 is a block diagram illustrating an embodiment of dividing object models into tiers. In the example shown, object models are ranked and shown in order from highest ranking Object model 1 to lower ranking Object model 2, Object model 3, Object model N, Object model N+1, Object model M, and Object model M+1. Also, a first tier capacity is shown and a second tier capacity is shown. Object model 1, Object model 2, Object model 3, and Object model N are allocated to the first tier as shown as they fit into the first tier capacity. Object model N+1 to Object model M are allocated to the second tier.

Figure 10:
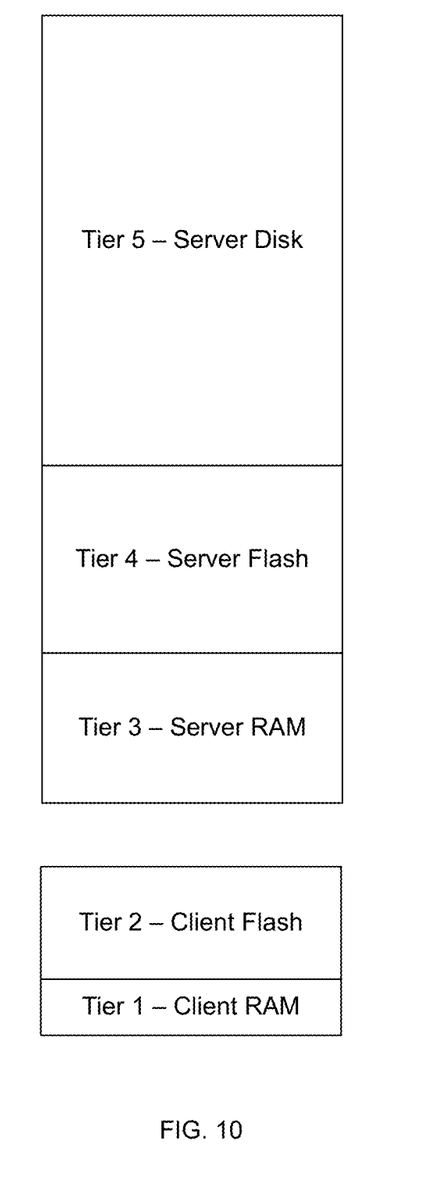
FIG. 10 is a block diagram illustrating an embodiment of tiers.

FIG. 10 is a block diagram illustrating an embodiment of tiers. In the example shown, client tiers are shown as a client RAM tier (tier 1) and a client flash tier (tier 2). Server tiers are shown as a server RAM tier (tier 3), a server flash tier (tier 4), and a server disc tier (tier 5).

In various embodiments, the mapping of tiers corresponds with other criteria—for example, device boundaries, communication latency, search fidelity, search quality, memory capacity, or any other appropriate tier mapping.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for search of image data, comprising:
   a processor; and
   a memory having stored thereon instructions that, when executed by the processor, cause the processor to:
   receive the image data from a client device of a user,
   obtain a plurality of object models used for visual recognition of objects in the image data, wherein each of the plurality of object models is associated with an image object capable of being identified within an image,
   determine a rank for each of the plurality of object models, identify a first set of the plurality of object models to be used by the client device and a second set of the plurality of object models to be used by a server based on the rank, and provide the first set of the plurality of object models to the client device and the second set of the plurality of object models to the server so that the client device performs a first search for a first set of objects in the image data based on the first set of the plurality of object models and the server performs a second search for a second set of objects in the image data based on the second set of the plurality of object models.

2. The system as in claim 1, wherein the first set of the plurality of object models are identified based, at least in part, upon storage capacity of the client device.

3. The system as in claim 2, wherein the first set of the plurality of object models are identified based, at least in part, upon a size associated with each object model and the rank associated with each object model.

4. The system as in claim 1, wherein the visual recognition comprises recognizing at least one of: barcode type, icons, logos, advertisements, media, brands, products, geography, and structures.

5. The system as in claim 4, wherein:
at least one of the server and the client device are configured to provide a result for a first object identified in the image data using one of the plurality of object models; and
the result comprises one or more of: text tag, metadata, results page, results indicator, vocalized tag, visual animation, an action such as a redirection to a webpage or a video, a visual ranking of objects, or a vocalized ranking of objects.

6. A method implemented on a computing device having at least one processor, storage, and communication platform for search of image data, comprising:
receiving the image data from a client device of a user;
obtaining a plurality of object models used for visual recognition of objects in the image data, wherein each of the plurality of object models is associated with an image object capable of being identified within an image;
determining, by the processor, a rank for each of the plurality of object models;
identifying a first set of the plurality of object models to be used by the client device and a second set of the plurality of object models to be used by a server based on the rank; and
providing the first set of the plurality of object models to the client device and the second set of the plurality of object models to the server so that the client device performs a first search for a first set of objects in the image data based on the first set of the plurality of object models and the server performs a second search for a second set of objects in the image data based on the second set of the plurality of object models.

7. A computer program product for search of image data, the computer program product being embodied in a non-transitory computer readable storage medium and comprising computer executable instructions for:
receiving the image data from a client device of a user;
obtaining a plurality of object models used for visual recognition of objects in the image data, wherein each of the plurality of object models is associated with an image object capable of being identified within an image;
determining, by the processor, a rank for each of the plurality of object models;
identifying a first set of the plurality of object models to be used by the client device and a second set of the plurality of object models to be used by a server based on the rank; and
providing the first set of the plurality of object models to the client device and the second set of the plurality of object models to the server so that the client device performs a first search for a first set of objects in the image data based on the first set of the plurality of object models and the server performs a second search for a second set of objects in the image data based on the second set of the plurality of object models.

8. The method as in claim 6, further comprising:
determining a change in the rank of at least one of the plurality of object models;
wherein the first set of the plurality of object models to be provided to the client device is identified based, at least in part, on the change in the rank of the at least one of the plurality of object models.

9. The method as in claim 8, wherein the change in the rank of at least one of the plurality of object models is triggered by at least one of: a change of location of the client device, a change of user preference, a new search history pattern, feedback from the user, a change of friend or family information, and a local event.

10. The method of claim 6, further comprising:
determining that there is an update to at least one of the first set and the second set; and
transmitting the update to the at least one of the first set and the second set to the client device.

11. The method as in claim 10, wherein a timing of the update being transmitted to the client device is based on one or more thresholds.

12. The method as in claim 11, wherein at least one of the one or more thresholds is user configurable or tailored to the user.

13. The method as in claim 6, wherein the client device comprises a mobile device, a fixed device, a phone, a tablet, a camera, a laptop, a desktop computer, a webcam, an appliance, or any other imaging device.

14. The method as in claim 6, wherein the relevance is determined based, at least in part, upon at least one of a location of the user, a user preference, a search history pattern, feedback from the user, friend or family information, or a local event.

15. The method as in claim 6, wherein the ranking is performed based, at least in part, upon an ontology feature or a collaborative feature.

16. The method of claim 6, further comprising:
determining, in response to the client device performing the first search for the first set of objects in the image data, that at least one recognition result has been recognized at the client device; and
providing the at least one recognition result to the client device.

17. The method of claim 16, further comprising:
determining, in response in response to the server performing the second search for the second set of objects in the image data, that at least one recognition result has been recognized at the server; and
providing, from the server, the at least one recognition result to the client device.

* * * * *